Figure 1:
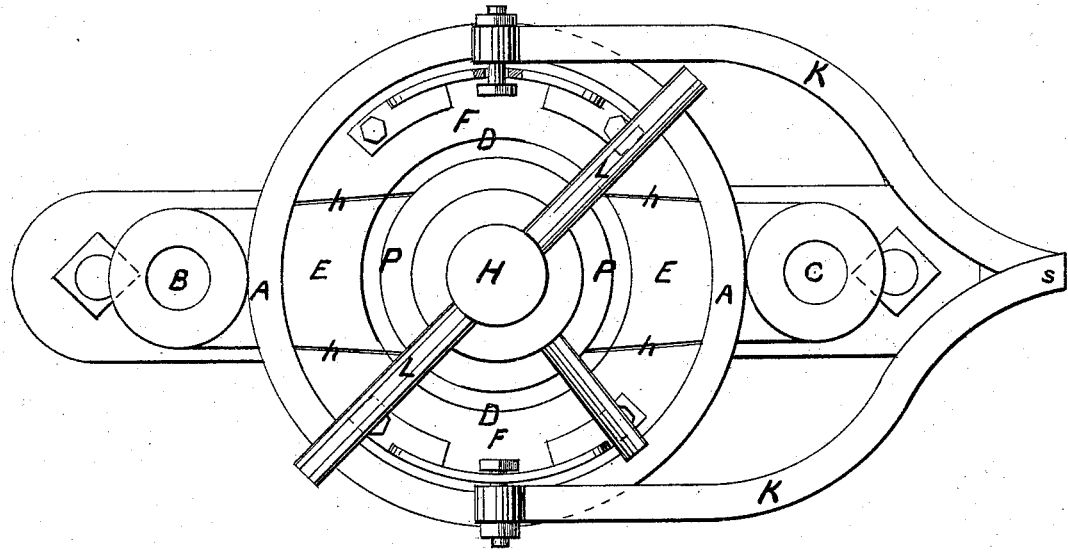

2 Sheets—Sheet 1.

P. W. DOHERTY.
MOLDING APPARATUS.

No. 170,070. Patented Nov. 16, 1875.

WITNESSES.
E. B. Rich
Sam'l Lespeaux

INVENTOR.
Patrick W. Doherty
per Brown Brothers
Attorneys.

N. PETERS, PHOTO-LITHOGRAPHER, WASHINGTON, D.C.

2 Sheets—Sheet 2.
P. W. DOHERTY.
MOLDING APPARATUS.
No. 170,070. Patented Nov. 16, 1875.
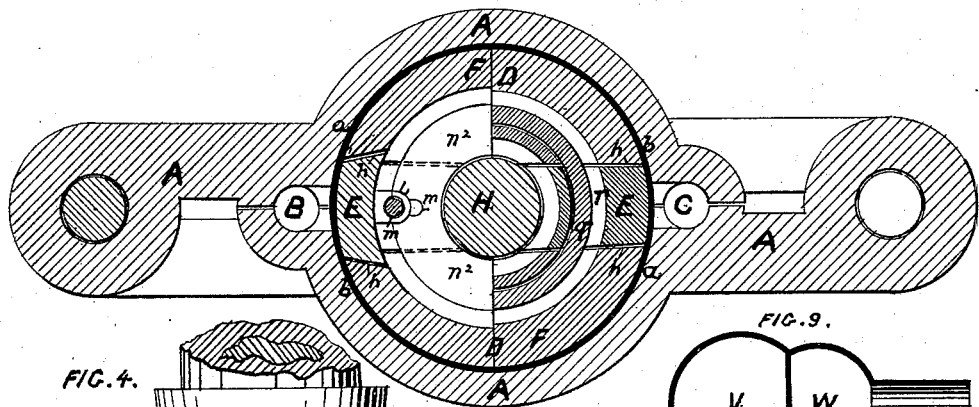
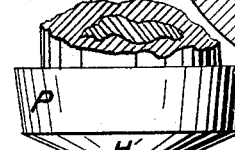
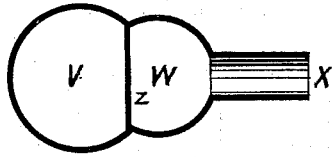
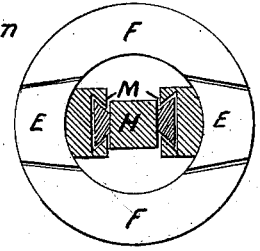
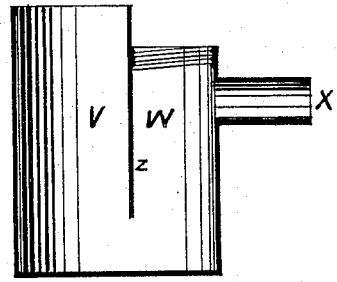
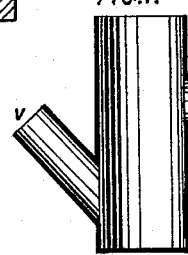
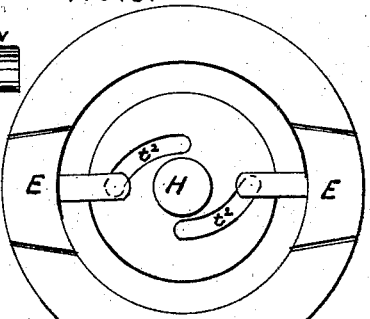
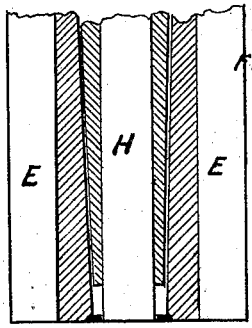
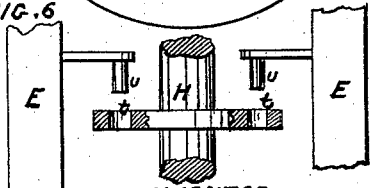
WITNESSES.
E. B. Rich
Saml. Ilespeau
INVENTOR,
Patrick W. Doherty
per Brown Brothers
Attorneys.
N. PETERS, PHOTO-LITHOGRAPHER, WASHINGTON, D. C.

UNITED STATES PATENT OFFICE.

PATRICK W. DOHERTY, OF BOSTON, MASSACHUSETTS.

IMPROVEMENT IN MOLDING APPARATUS.

Specification forming part of Letters Patent No. 170,070, dated November 16, 1875; application filed May 7, 1875.

*To all whom it may concern:*

Be it known that I, PATRICK W. DOHERTY, of Boston, in the county of Suffolk and State of Massachusetts, have invented a new and useful Improvement in Metallic Molds for Molding Lead Vessels, &c., of which the following is a specification:

This invention relates to metallic molds or apparatus for molding vessels; and it specially pertains to the molding of lead traps for water-closets, although it is capable of use for molding other vessels, as will hereinafter appear.

One object, among others, of this invention is to secure the withdrawal of a molded vessel from the mold with absolute safety against cracking or fissuring; and for this object more especially this improved molding apparatus, in substance, consists of an outer shell or matrix, which, as usual, is made in parts, hinged together, to be opened and closed, as desired, and interiorly formed for the shape of the outside of the vessel to be molded, and of a core, which is in parts, of novel construction, as hereinafter described, for enabling it to be relieved from the interior of the molded vessel, to be afterward withdrawn. The dividing-lines of the parts to the core extend from end to end, and from the external periphery toward the center of the core, and, interiorly, more or less of the several parts are adapted, as hereinafter described, to be operated within certain limits, so as to be set either inwardly nearer to or outwardly farther from the center of the core; and, also, the joints or seams of the several parts with each other are constructed in such form that the setting in of the parts adapted for the said inward and outward movement frees or loosens the remaining parts of the core, and the setting out of the parts adapted for the said inward and outward movement forces the remaining parts outwardly, and thus makes the whole series of parts produce a core which, substantially, is solid, and in its external periphery is substantially without seam or joint.

In addition to the above, this improved core embraces other novel features in construction, hereinafter fully described, and these features are more or less important to the desired perfect working of the core.

In the accompanying plates of drawings is shown an apparatus for molding water-traps for water-closets, which embraces all the features of the present invention.

Figure 2:
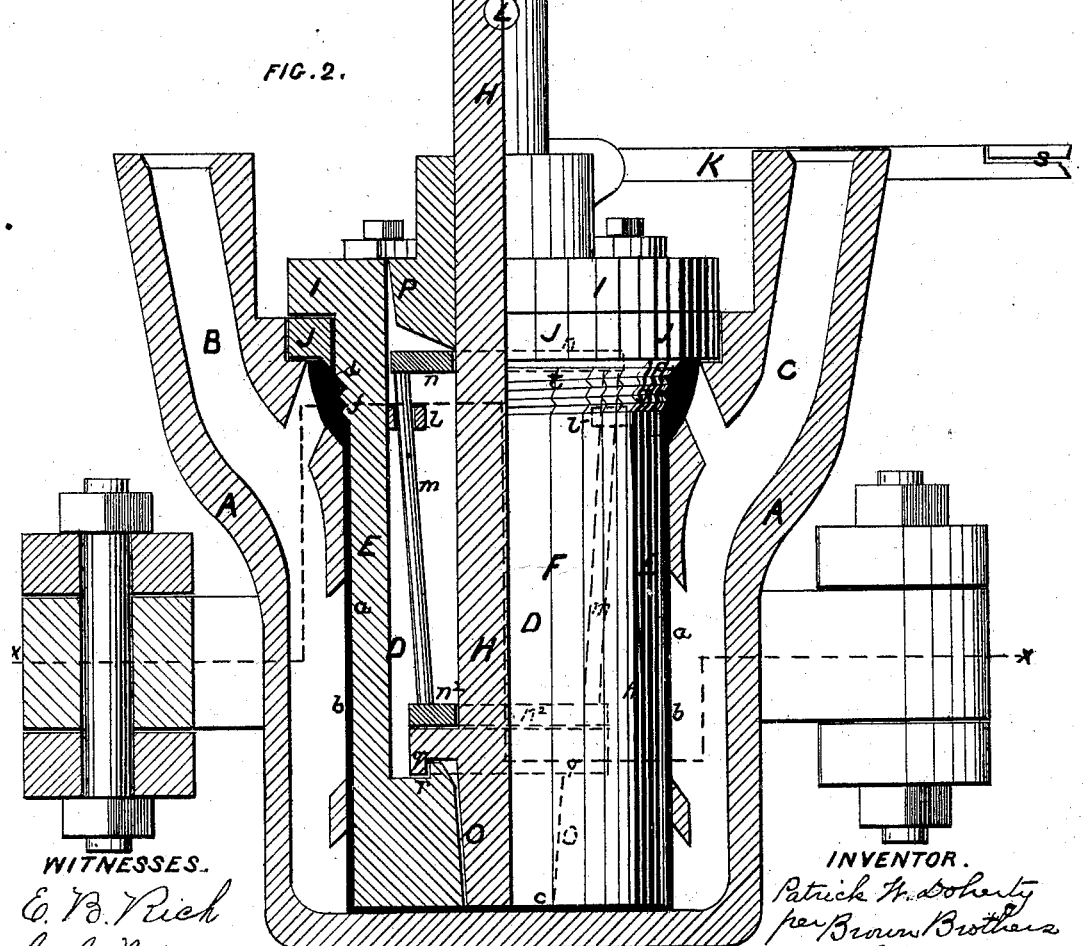

In Plate 1, Figure 1, is a plan view of a matrix having my improved core inserted; and Fig. 2 is a central vertical section of the matrix and one-half of the core, its other half being in elevation. In Plate 2, Fig. 3 is a cross-section on line *x x*, Fig. 2. Fig. 4 is an elevation of the core removed from its matrix, illustrating it as it appears just after manipulation to loosen it within the mold before lifting it out.

In addition to the several figures above enumerated, the drawings include other figures, showing modifications in construction of some parts of the core, and also other matters pertaining to a molding apparatus of my improved kind, all of which will be hereinafter particularly described.

The heavy black line *a*, in Figs. 2 and 3, represents the vessel, which is, in the first case, shown in central vertical section, and in the second is shown in horizontal section. This vessel *a* is cylindrical in shape, has vertical sides *b*, a bottom, *c*, and an open flaring top, *d*, and it is interiorly formed at its open top with a screw-thread, *f*, to receive a closing screw-cap, substantially as in Letters Patent issued to me January 7, 1873, No. 134,652.

In the drawings, A represents the matrix of the molding apparatus. This matrix A is of the usual construction—that is, in height or length it is in two parts, which parts, at one side, are hinged together to be opened and closed at pleasure, and at the other side, are adapted to be tightly closed, and it has a cast-gate, B, and an air-gate, C, all as ordinarily in metal molds.

Interiorly the matrix is shaped to give the exterior form of the vessel *a*, and the vessel is molded in it by running the molten metal into the space embraced by the black line *a*, and by the thickness of this black line is represented the difference between the interior diameter of the matrix and the exterior diameter of the core D at all parts, as shown.

The core D is in four parts, which are in pairs, E E and F F. The parts of each pair E E and F F are of corresponding shape, and, as to themselves, they all make, when together, (see Figs. 1, 2, and 3,) a cylindrical shell, which is open at both ends, and corresponds in its external periphery to the inside periphery of the vessel to be molded.

The open ends of the cylindrical shell part of the core D are closed by a common central shaft or plug, H, to be hereinafter more particularly described, and the inner end of this plug completes the inner end of the shell part of the core D for molding the inside of the bottom to the vessel $a$. The members E E and F F of the core D alternate with each other—that is, each part E is between the two parts F F, and each part F is between the two parts E E—and the parts of each pair are diametrically opposite to each other. $h$, the contact edges or faces of the several parts E E and F F, when said parts are disposed to make the core D. The several faces or edges $h$ run at an angle to the length, and at an angle to the diameter, of the core, and in each angle they correspond in each part. The angle, as to the length of the core, is such as to taper the parts from end to end, making them wider at one end than at the other, and the angle as to the diameter of the core is such as to taper the parts in their thickness—that is, in the direction of their diameter—making the parts E E the narrower and the parts F F the wider at their external periphery, and the two angles of taper give a wedge form to each part, both in thickness and length. The wider ends of the core parts E E are at the outer end or top, and the wider ends of the core parts F F are at the inner end or bottom of the matrix. $l$, lugs attached to inside of each core part E, one to each part, and $m$ a vertical rod passing loosely through each lug $l$. These rods $m$ are secured to rings $n$ $n^2$, which loosely surround but are fixed against movement along the central plug H. The rods $m$ similarly and downwardly incline to the axis of the central plug, and this inclination is such that if the plug be drawn out of the core parts, which drawing out of the plug draws the rods $m$ up through the lugs $l$, the parts E, to which said lugs are fastened, will be drawn inwardly toward the axis of the plug, and if the plug be forced in, the core parts E to which said lugs are fastened will be forced outwardly from the axis of the plug. The core parts E E and F F rest against the periphery O of the lower end, and against the periphery P of the upper end of the central plug H, and these peripheries both taper correspondingly with the inclination of the rods $m$ $m$, and their diameter is sufficient to set out both ends of the core parts to their proper external diameter of core. $q$, an annular vertical rib, which surrounds and is fixed concentrically near the inner end of the central plug H, and $r$ a vertical groove near the inner end of the several core-sections E E and F F. The groove $r$ receives the said rib $q$ of the central plug H, and interlocks the several core-sections with the central plug H, and this interlock holds the inner ends of the core-sections to a fixed and uniform position externally. I, a shoulder on the outer end of each core part E E F F, and J a solid ring set in the upper end of the matrix A. The shoulders I rest on the ring J when the core is placed in the matrix, and the internal periphery of the ring holds the outer ends of the core-sections to a fixed and uniform position externally. K, arms pivoted together at S, and at one end attached one to each outer end of the two parts F F of the core, and at their other ends provided with suitable handles for operating them, for lifting the core parts F F out of the matrix A; L, a handle fixed to outer end of plug for convenience in lifting it, and for revolving it within the core parts E E F F.

The improved molding apparatus above described is used as follows: First, close the matrix A and see that the ring J is in place. Now, place the two parts F of the core D into the matrix, and, having properly seated them on the ring J, then insert the other two parts E E of the core, and force them into the matrix, bringing them to a seat on the ring J, when force the plug H into the core, which drives the core parts E E and F F outwardly, and brings them all to their proper position, leaving the mold ready for pouring the metal in the usual manner. The pouring of the metal being accomplished, and after allowing sufficient time for the metal to set, draw out the core parts E E, and then the core parts F F. When opening the matrix remove the molded vessel, and proceed as before.

In the insertion of the core parts E E, as above described, their double-wedge form, together with the similar double-wedge form of the other core parts F F, forces the several parts to a tight and close joint with each other; and this is accomplished, first, by the action of the wedge in their length, and then by the action of the wedge in their thickness, which latter action commences as the central plug is forced down into the core, after the core parts E E have been seated on the solid ring J, and is occasioned by the travel of the inclined rods $m$ through the lugs $l$ of the core parts E E, as is obvious without further explanation from an inspection of the drawing and of the preceding description, and, as the central plug H is of the taper form described, also by the taper of the said plug.

The above-described outward movement of the core-sections E E F F is limited at the outer end of the core by the inner periphery of the solid ring J, and at the inner end of the core by the interlock of the annular rib or flange $q$ of the plug and the annular groove $r$ of the core-sections, and thus, by these two limits, is insured the proper and even position of the several core-sections as to their external periphery.

In withdrawing the core parts E E from the matrix, which is done by lifting on the central plug H, they are first drawn inwardly or toward the plug by the travel of the inclined rods $m$, attached to the plug H, through the lugs $l$, attached to them; and this inward movement continues until contact between the plug and core-sections, when the core parts then lift with the plug, and are thus removed from the matrix. The inward movement of the core parts E E of course carries them away from the inside of the molded vessel, and thus secures the release of their male thread $t$ from the corresponding female thread of the molded vessel. The carrying away of the core parts E E from the molded vessel, and because of their wedge in thickness, also loosens the core parts F F in their bind or bearing against the inside of the molded vessel; or, in other words, it, in fact, at once loosens the whole core, and thus obviously prevents all danger of the cracking or fissuring of the molded vessel.

With the core parts E E removed from the matrix, to remove the other core parts F F, first close them together sufficiently to make sure their screw-thread is released from the screw-thread of the molded vessel, when, lift them directly out.

The herein-described limit at the outer end of the core to the outward movement of the core-sections under the action of the plug may be secured by substituting for the solid ring J abutments suitably located on the matrix, or by a similar internal construction to that described at the inner end of the core-sections and central plug, or the said outward limit for both ends may be secured by a dovetail connection between the central plug H and core-sections E E F F, such as shown at M, Fig. 10, more particularly, and by this dovetail connection may be secured the drawing in and forcing out of the core-sections E E F F, hereinabove described, as done by the inclined rods $l$ and lugs $m$ through manipulation of the plug H, provided the dovetail connection was at an angle to the length of the plug and the core-sections, as, for instance, as seen in Fig. 11. This dovetail connection is substantially the same as the described inclined rod $m$ and lug $l$ connection, and differs substantially only as to form.

An outward limit to the core-sections is all-important in any case with a core made in sections, whether their seams be in straight or inclined lines from end to end, or from outside to inside, as otherwise their even set at the external periphery could not be insured, and while this outward limit can be secured from the action of parts outside or inside, or both inside and outside of the core, still, if a vessel with a closed bottom is to be molded, the outside limit to the end of the core which molds the bottom of the vessel must be secured inside of, and cannot be secured outside of the outer periphery of the core-sections.

As has been described, the central plug H passes through the inner end of the core-sections E E F F, and completes the bottom of the core; and this is important, for, if the core-sections themselves made the whole bottom, it is obvious they could not move in under the described manipulation and operation of the central plug, whereas, by leaving the core-sections open at the center of their lower ends, for the entrance of the plug to complete the lower end of the core, when the plug is drawn out from such central opening, and with the plug tapered as described, obviously the core-sections are free to draw in, as desired. The same result would be obtained with a straight end to the plug, by which it enters the opening of the core-sections, (as, for instance, see Fig. 11,) but a taper end is preferable, as it supports the core-sections for the whole movement of the plug.

In the described connection between the core-sections and central plug only the parts E E of the core are directly connected to the plug; but the other parts F F may be also directly connected to the plug, to be operated thereby, and thus secure a simultaneous removal of all the core-sections.

With a connection between all the sections of the core and the central plug, substantially such as has been described for the core-sections E E, the connection between the core-sections F F should be constructed so as to be inactive during the first part of the operation of the connection between the core-sections E E, and to commence to act after said operation of the core-sections E E has occurred to a sufficient degree that in the then movement of the core-sections F F there will be no danger of a bind between the two sets of sections. A suitable construction for this purpose is simply to have the rods $m\ m$, which operate on the core-sections F F parallel to the outer face of the sections for that part, drawn through while the rods $m\ m$ are operating on the core-sections E E, and beyond, on the proper taper or incline, to then, as they are drawn through, work the core-sections F F.

The core may be made in more or less sections or parts; but it is preferable to make it in four parts.

Figs. 5 and 6 show the core-sections E E as interiorly adapted to be drawn in and forced out by revolving the central plug or shaft H. This adaptation consists in the construction of the central plug H with two similar cam or eccentric slots, $t^2\ t^2$, one for each core part E, and of the core parts E E with a pin, U, to enter the said cam-slots by drawing the plug straight out for a short distance, which is necessary, as the inner end of the core parts must be opened at the center to admit of the core parts E E moving in from the action of the eccentrics' slots on their pins.

This arrangement of parts for operating the core parts E E differs from that previously described, in that the movement of the parts E E is produced from revolving the plug, instead of by a straight drawing out of the plug; but, in both, the core-sections are worked in and out from their inside.

The molding apparatus herein described obviously may be used for other molding purposes than that particularly specified; and, with a matrix suitable to mold a water-trap vessel such as shown in Fig. 7—that is, a vessel having passages entering the sides V W—by the use of a core of my improved construction, one for the body, and one for each side passage, such a vessel can be molded with as good success as a vessel requiring only one of my improved cores. Also, with my improved molding apparatus a water-trap vessel, such as shown in vertical section, Fig. 8, and in horizontal section, Fig. 9, can be readily molded; and, to mold it, use a matrix of the proper form, and three of my sectional cores D—one for the chamber V, another for the chamber W, and another for the side passage X. The cores for the chambers V and W are each made square at one side to secure the partition-walls Z, and either one or both are constructed to project beyond the plane of such partition to secure the opening Y in the partition as the vessel is molded; and the core within the chamber W is made with a flat surface for the bearing of the inner end of the core within the side passage X.

Having now described my invention, what I claim, and desire to secure by Letters Patent, is—

1. The herein-described combined construction of a hollow sectional core, and of an inside plug, for an interlock between the plug and the inside of core-sections, and for a head or end to the core, which practically, and without additional fastening or other devices, is solid and rigid, and is without seam or joint, all as and for the purposes specified.

2. A hollow sectional core, constructed with sections of a wedge shape from end to end, and from outside to inside, all substantially as described, for the purpose specified.

3. The combination of a hollow sectional core and an inside plug, constructed and adapted to form a solid head to the core, in combination with a matrix to secure, with the core, the molding of a head or end to the cylindrical part or body molded in the matrix, all substantially as described.

4. A matrix, constructed to seat a ring, and for the ring to close the molding-space between the core and matrix, in combination with core-sections constructed to fit within, and to rest on, said ring, substantially as described, and for the purposes specified.

5. The combination, with a sectional core, of an inside plug, connected by mechanism with more or less of the core-sections for setting them out and in, and adapted to be turned without effect on the said connecting mechanism, substantially as and for the purpose specified.

6. The connection of sections of a hollow sectional core with an inside plug by means of rods $m$ and lugs $l$, substantially as described, and for the purpose and operation on the core-sections specified.

The above specification of my invention signed by me this 19th day of February, A. D. 1875.

PATRICK W. DOHERTY.

Witnesses:
ALBERT W. BROWN,
GEO. H. EARL.